(12) United States Patent
Chen et al.

(10) Patent No.: US 12,249,713 B2
(45) Date of Patent: Mar. 11, 2025

(54) ELECTRODE PLATE, METHOD FOR PREPARING SAME, SECONDARY BATTERY, BATTERY MODULE, AND BATTERY PACK

(71) Applicant: CONTEMPORARY AMPEREX TECHNOLOGY (HONG KONG) LIMITED, Hong Kong (CN)

(72) Inventors: Wei Chen, Ningde (CN); Huan Che, Ningde (CN); Fang Luo, Ningde (CN); Shisong Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/634,752

(22) Filed: Apr. 12, 2024

(65) Prior Publication Data

US 2024/0282958 A1    Aug. 22, 2024

Related U.S. Application Data

(63) Continuation of application No. PCT/CN2022/124963, filed on Oct. 12, 2022.

(30) Foreign Application Priority Data

Jan. 4, 2022  (CN) .......................... 202210001673.3

(51) Int. Cl.
  *H01M 4/04*    (2006.01)
  *H01M 4/02*    (2006.01)
  (Continued)

(52) U.S. Cl.
  CPC ......... *H01M 4/525* (2013.01); *H01M 4/0404* (2013.01); *H01M 4/1391* (2013.01);
  (Continued)

(58) Field of Classification Search
  None
  See application file for complete search history.

(56) References Cited

U.S. PATENT DOCUMENTS

| | | | |
|---|---|---|---|
| 2016/0268578 A1* | 9/2016 | Ichikawa | H01M 50/507 |
| 2018/0006304 A1* | 1/2018 | Waki | H01M 4/622 |

(Continued)

FOREIGN PATENT DOCUMENTS

| | | |
|---|---|---|
| CN | 104659368 A | 5/2015 |
| CN | 105655540 A | 6/2016 |

(Continued)

OTHER PUBLICATIONS

Contact angle, available online at https://en.wikipedia.org/wiki/Contact_angle#:~:text=Generally%2C%20if%20the%20water%20contact,solid%20surface%20is%20considered%20hydrophobic., date unknown.*

(Continued)

*Primary Examiner* — Anca Eoff
(74) *Attorney, Agent, or Firm* — Kilpatrick Townsend & Stockton LLP (57) ABSTRACT

In various embodiments, provided are an electrode plate comprising a main body region and an isolation region, the isolation region is arranged on both sides of the main body along a width direction of the electrode plate, the isolation region is provided with an insulating strip coating, and the main body region is provided with an active material layer, a method for preparing the electrode plate, a secondary battery, a battery module, and a battery pack. An outer edge of the active material layer is confined to a junction between the main body region and the isolation region, and a contact angle between a slurry forming the active material layer and the insulating strip coating is more than 90°, thereby improving the problem of diffusion of the active material slurry (Continued)

along the width direction of the electrode plate, and reducing a defective rate of the electrode plate.

19 Claims, 5 Drawing Sheets

(51) Int. Cl.
*H01M 4/1391* (2010.01)
*H01M 4/525* (2010.01)
*H01M 4/62* (2006.01)
*H01M 4/66* (2006.01)

(52) U.S. Cl.
CPC .......... *H01M 4/623* (2013.01); *H01M 4/667* (2013.01); *H01M 2004/028* (2013.01)

(56) References Cited

U.S. PATENT DOCUMENTS

| | | | | |
|---|---|---|---|---|
| 2019/0013510 | A1* | 1/2019 | Londarenko | H01M 50/46 |
| 2021/0036332 | A1* | 2/2021 | Kawamoto | H01M 4/366 |

FOREIGN PATENT DOCUMENTS

| | | |
|---|---|---|
| CN | 108511679 A | 9/2018 |
| CN | 211789269 U | 10/2020 |
| CN | 112038644 A | 12/2020 |
| CN | 112563455 A | 3/2021 |
| CN | 113659103 A | 11/2021 |
| JP | 038260 A | 1/1991 |
| JP | 2004526278 A | 8/2004 |
| JP | 2008251469 A | 10/2008 |
| JP | 2010103089 A | 5/2010 |
| JP | 2017212088 A | 11/2017 |
| JP | 2019160553 A | 9/2019 |
| JP | 2021026852 A | 2/2021 |

OTHER PUBLICATIONS

Notice of Reasons for Refusal received in the counterpart Japanese Application 2024-501639, mailed on Jul. 23, 2024.
Request for the Submission of an Opinion received in the counterpart Korean Application 10-2024-7004501, mailed on May 13, 2024.
International Search Report received in the corresponding International Application PCT/CN2022/124963, mailed Jan. 9, 2023.
Written Opinion of ISA received in the corresponding International Application PCT/CN2022/124963, mailed Jan. 9, 2023.
The Decision to Grant a Patent received in the counterpart Japanese application 2024-501639, mailed on Dec. 10, 2024.
The Written Decision on Registration received in the counterpart Korean application 10-2024-7004501, mailed on Nov. 18, 2024.

* cited by examiner

ELECTRODE PLATE, METHOD FOR PREPARING SAME, SECONDARY BATTERY, BATTERY MODULE, AND BATTERY PACK

CROSS-REFERENCE TO RELATED APPLICATIONS

The present application is a continuation of international application PCT/CN2022/124963, filed on Oct. 12, 2022, which claims the priority to Chinese Patent Application No. 202210001673.3 filed on 4 Jan. 2022 and entitled "ELECTRODE PLATE, METHOD FOR PREPARING SAME, SECONDARY BATTERY, BATTERY MODULE, AND BATTERY PACK," the entire contents of which are incorporated herein by reference.

TECHNICAL FIELD

The present application relates to the technical field of lithium batteries, and particularly relates to an electrode plate, a method for preparing the same, a secondary battery, a battery module, and a battery pack.

BACKGROUND

Characterized by large specific energy, high working voltage, low self-discharge rate, small volume, and light weight, secondary batteries (lithium-ion batteries) are widely used in products, such as electric vehicles and electronic devices.

The applicant finds that a width of an active material layer in an existing electrode plate easily changes due to diffusion of an active material slurry along its width direction, thereby resulting in a problem of misalignment caused by inconsistent widths of active material layers on both sides of the electrode plate, increasing a defective rate of the electrode plate, and affecting quality of the secondary battery.

SUMMARY OF THE INVENTION

In view of the above problems, an object of the present application is to improve width consistency of an active material layer in an electrode plate, thus reducing a defective rate of the electrode plate.

In order to achieve the above object, the present application provides an electrode plate, a secondary battery, a battery module, a battery pack, and an electrical apparatus.

A first aspect of the present application provides an electrode plate, comprising a main body region and an isolation region, where the isolation region is arranged on both sides of the main body region along a width direction of the electrode plate, the isolation region is provided with an insulating strip coating, and the main body region is provided with an active material layer. An outer edge of the active material layer is confined to a junction between the main body region and the isolation region, and a contact angle between a slurry forming the active material layer and the insulating strip coating is more than 90°, and is optionally more than 125°. Therefore, the large contact angle between the slurry of the active material layer and the insulating strip coating reduces climbing and migration between the active material and the insulating strip coating, and improves a problem of diffusion of the active material slurry along the width direction of the electrode plate, thereby effectively improving the width consistency of the active material layer in the electrode plate, reducing a risk of misalignment caused by inconsistent widths of active material layers on both sides of the electrode plate, and reducing the defective rate of the electrode plate.

In any embodiment, the insulating strip coating comprises a functional material. The slurry forming the active material layer is a slurry of an aqueous system, and the insulating strip coating comprises a hydrophobic material; or the slurry forming the active material layer is a slurry of an oily system, and the insulating strip coating comprises an oleophobic material, thereby inhibiting diffusion of the aqueous active material slurry or the oily active material slurry to an edge of the electrode plate.

In any embodiment, the hydrophobic material comprises at least one of polyolefin, polycarbonate, polyamide, and polyacrylonitrile. The above hydrophobic material has good hydrophobic performance.

In any embodiment, the oleophobic material comprises at least one of polytetrafluoroethylene and nanometer $SiO_2$. The above oleophobic material has good oleophobic performance.

In any embodiment, a thickness $H_1$ of the insulating strip coating is less than a thickness $H_2$ of the active material layer, thereby enabling the isolation region to have a good inhibitory effect on the diffusion of the active material layer, and resulting in an electrode plate with good quality.

In any embodiment, the thickness $H_1$ of the insulating strip coating is from 5 μm to 30 μm, and the thickness $H_2$ of the active material layer is from 30 μm to 150 μm, thereby enabling the insulating strip coating to have a good inhibitory effect on the diffusion of the active material layer, and resulting in an electrode plate with good quality.

In any embodiment, the thickness $H_1$ of the insulating strip coating and the thickness $H_2$ of the active material layer satisfy: $1/5 \leq H_1:H_2 \leq 2/3$, thereby reducing a risk of crushing the electrode plate due to too large thickness $H_1$ of the insulating strip coating during cold pressing, and contributing to further improvement of the quality of the electrode plate.

In any embodiment, a width of the insulating strip coating is from 1 mm to 20 mm, so that an electrode plate with good quality can be obtained.

A second aspect of the present application further provides a method for preparing an electrode plate, including steps of: preparation of an insulating strip coating: mixing a functional material, an insulating material, and a first binder, then adding a first solvent into the mixture, to form a first slurry, coating the first slurry on both sides of a surface of a current collector along a length direction of the current collector, and drying to form two insulating strip coatings; where a surface of the current collector uncoated with the first slurry between the two insulating strip coatings forms a main body region, and the functional material is selected from a hydrophobic material or an oleophobic material; and preparation of an active material layer: mixing an electrode active material, a conductive agent, and a second binder, then adding a second solvent into the mixture, to form a second slurry; coating the second slurry on the surface of the main body region, and drying to form the active material layer. A contact angle between the second slurry and the insulating strip coating is more than 90°, and is optionally more than 125°.

Therefore, the preparation method in the present application has the advantages of simple preparation process and extensive sources of functional materials, is suitable for large-scale production, and is conducive to reducing production costs.

In any embodiment, based on a total mass of the insulating strip coating, a percentage mass content of the functional material is from 40% to 70%, a percentage mass content of the insulating material is from 20% to 30%, and a percentage mass content of the first binder is from 10% to 30%. The contents of the functional material, the insulating material, the first binder, and the first solvent are synergistically regulated to be within the above ranges, thereby enabling the insulating strip coating to have a good inhibitory effect on the diffusion of the active material layer.

In any embodiment, the functional material is selected from a hydrophobic material, the first solvent is selected from an oily solvent, and the second solvent is selected from an aqueous solvent; or the functional material is selected from an oleophobic material, the first solvent is selected from an aqueous solvent, and the second solvent is selected from an oily solvent.

In any embodiment, the aqueous solvent is selected from at least one of deionized water, ethylene glycol, and ethanol; and the oily solvent is selected from at least one of N-methyl pyrrolidone, N-dimethylformamide, and dimethyl sulfoxide.

In any embodiment, the first binder and the second binder each independently comprise polyvinylidene fluoride or styrene butadiene rubber. The above binder has good interface bonding performance.

In any embodiment, the insulating material comprises at least one of aluminum oxide and boehmite. The above insulating material has outstanding insulation characteristics, thereby enabling the insulating strip coating to have outstanding insulation performance, and improving the performance of the electrode plate.

A third aspect of the present application provides a secondary battery, comprising the electrode plate in the first aspect of the present application.

A fourth aspect of the present application provides a battery module, comprising the secondary battery in the third aspect of the present application.

A fifth aspect of the present application provides a battery pack, comprising the battery module in the fourth aspect of the present application.

A sixth aspect of the present application provides an electrical apparatus, comprising at least one of the secondary batteries in the third aspect of the present application, the battery module in the fourth aspect of the present application, or the battery pack in the fifth aspect of the present application.

The beneficial effects of the present application include:

The present application provides an electrode plate, a method for preparing the same, a secondary battery, a battery module, and a battery pack, the electrode plate comprises a main body region and an isolation region located on both sides of the main body region, where the isolation region is provided with an insulating strip coating, so that an outer edge of an active material layer is confined to a junction between the main body region and the isolation region. Further, a contact angle between a slurry forming the active material layer and the insulating strip coating is more than 90°. The large contact angle reduces climbing and migration between the active material slurry and the insulating strip coating, and improves a problem of diffusion of the active material slurry along a width direction of the electrode plate, thereby effectively improving width consistency of the active material layer in the electrode plate, reducing a risk of misalignment caused by inconsistent widths of active material layers on both sides of the electrode plate, and reducing a defective rate of the electrode plate.

DESCRIPTION OF REFERENCE NUMERALS 1 battery pack; 2 upper box; 3 lower box; 4 battery module; 5 secondary battery; 51 case; 52 electrode assembly; 53 cover plate; 11 main body region; 12 isolation region; 13 blank region; 14 current collector; 111 active material layer; 121 insulating strip coating

DETAILED DESCRIPTION

Hereinafter, embodiments of an electrode plate, a secondary battery, a battery module, a battery pack, and an electrical apparatus of the present application are specifically disclosed by referring to the detailed description of the drawings as appropriate. However, there may be cases where unnecessary detailed description is omitted. For example, there are cases where detailed descriptions of well-known items and repeated descriptions of actually identical structures are omitted. This is to avoid unnecessary redundancy in the following descriptions and to facilitate understanding by those skilled in the art. In addition, the drawings and subsequent descriptions are provided for those skilled in the art to fully understand the present application, and are not intended to limit the subject matter recited in the claims.

"Ranges" disclosed in the present application are defined in the form of lower limits and upper limits, a given range is defined by the selection of a lower limit and an upper limit, and the selected lower and upper limits define boundaries of a particular range. A range defined in this manner may be inclusive or exclusive of end values, and may be arbitrarily combined, that is, any lower limit may be combined with any upper limit to form a range. For example, if the ranges of 60-120 and 80-110 are listed for a particular parameter, it is understood that the ranges of 60-110 and 80-120 are also contemplated. Additionally, if the minimum range values 1 and 2 are listed, and if the maximum range values 3, 4 and 5 are listed, the following ranges are all contemplated: 1-3, 1-4, 1-5, 2-3, 2-4 and 2-5. In the present application, unless stated otherwise, the numerical range "a-b" represents an abbreviated representation of any combination of real numbers between a to b, where both a and b are real numbers. For example, the numerical range "0-5" means that all real numbers between "0-5" have been listed herein, and "0-5" is just an abbreviated representation of the combination of these numerical values. In addition, when a parameter is expressed as an integer greater than or equal to 2, it is equivalent to disclosing that the parameter is, for example, an integer of 2, 3, 4, 5, 6, 7, 8, 9, 10, 11, 12, and the like.

Unless otherwise specified, all embodiments and optional embodiments of the present application may be combined with each other to form new technical solutions.

Unless otherwise specified, all technical features and optional technical features of the present application may be combined with each other to form new technical solutions.

Unless otherwise specified, all steps of the present application may be performed sequentially or randomly, and preferably sequentially. For example, the method includes steps (a) and (b), which means that the method may include steps (a) and (b) performed sequentially, or may include steps (b) and (a) performed sequentially. For example, the reference to the method may further comprise step (c), which means that step (c) may be added to the method in any order, for example, the method may comprise steps (a), (b) and (c), or may comprise steps (a), (c) and (b), or may comprise steps (c), (a) and (b), and so on.

Unless otherwise specifically stated, the terms "include/including" and "comprise/comprising" mentioned in the present application may be open-ended, or may be closed-ended. For example, the "including" and "comprising" may mean that other components that are not listed are further included or comprised, or only the listed components are included or comprised.

Unless otherwise specifically stated, the term "or" is inclusive in the present application. By way of example, the phrase "A or B" means "A, B, or both A and B." More specifically, the condition "A or B" is satisfied under any one of the following conditions: A is true (or present) and B is false (or absent); A is false (or absent) and B is true (or present); or both A and B are true (or present).

The applicant finds during study of the secondary battery that an active material slurry will diffuse outward along a width direction of an electrode plate of an existing secondary battery, which may be due to occurrence of a deviation of a width of an active material layer on a side A and a side B of an electrode when the active material slurry is coated on a surface of the current collector from a design width. After the width of the side A and the side B of the electrode plate deviates from the design width, the side A and the side B are more likely to be misaligned, thereby increasing a defective rate of the electrode plate.

Based on this, the applicant finds after in-depth study that an isolation region is arranged on both sides of a main body region (a region where the active material layer is provided) of the electrode plate, and the isolation region is provided with an insulating strip coating, so that an outer edge of the active material layer is confined to a junction between the main body region and the isolation region. Further, there is a large contact angle between the slurry forming the active material layer and the insulating strip coating, to reduce climbing and migration between the active material and the insulating strip coating, and improve a problem of diffusion of the active material slurry along the width direction of the electrode plate, thereby effectively improving width consistency of the active material layer in the electrode plate, reducing a risk of misalignment caused by inconsistent widths of active material layers on both sides of the electrode plate, and reducing the defective rate of the electrode plate.

In order to effectively reduce the defective rate of the electrode plate and improve the quality of the secondary battery, the present application provides an electrode plate, a method for preparing the same, a secondary battery, a battery module, and a battery pack.

Figure 1:
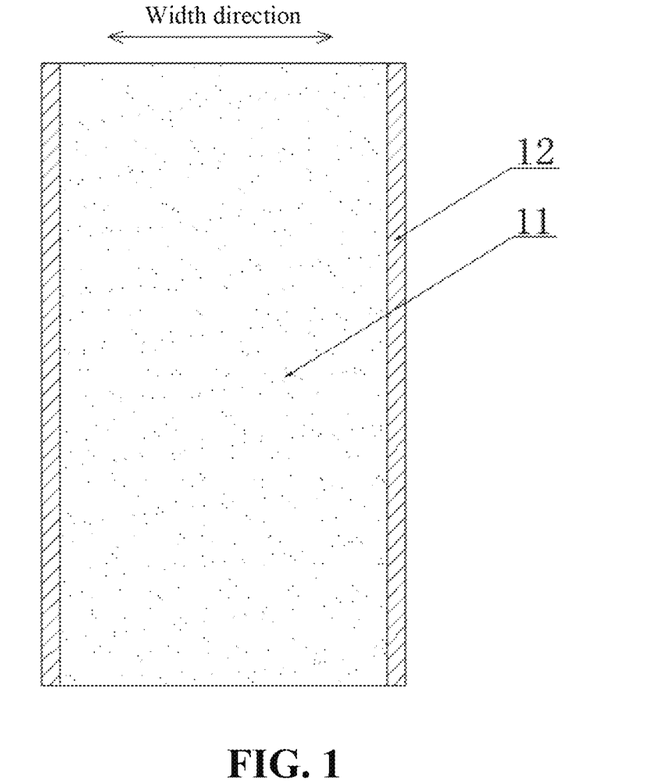
FIG. 1 is a schematic structural diagram of an electrode plate according to an embodiment of the present application.
Figure 2:
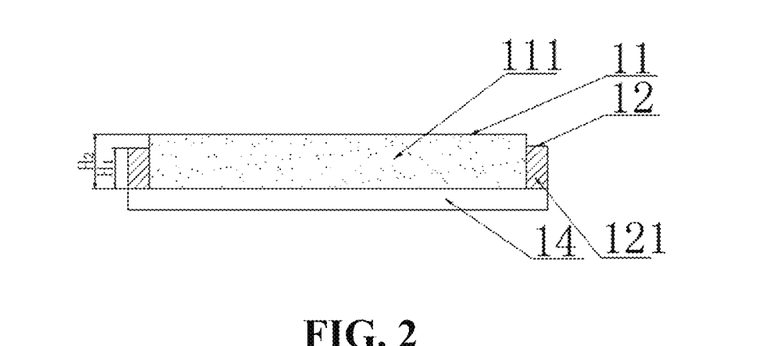
FIG. 2 is a schematic structural diagram of an electrode plate observed in a thickness direction according to an embodiment of the present application.

In an embodiment of the present application, the present application provides an electrode plate. As shown in FIG. 1, and FIG. 2, the electrode plate comprises a main body region 11 and an isolation region 12, where the isolation region 12 is arranged on both sides of the main body region 11 along a width direction of the electrode plate, the isolation region 12 is provided with an insulating strip coating 121, and the main body region 11 is provided with an active material layer 111. An outer edge of the active material layer 111 is confined to a junction between the main body region 11 and the isolation region 12, and a contact angle between a slurry forming the active material layer 111 and the insulating strip coating 121 is more than 90°, and is optionally more than 125°.

In the present application, the main body region 11 refers to a main part of a main body of the electrode plate, and the main body region 11 is usually provided with an active material layer 111. For example, the active material layer 111 may be coated on the surface of the current collector in the main body region 11; the isolation region 12 refers to parts arranged along the width direction of the electrode plate and located on both sides of the main body region 11 respectively, and the isolation region 12 is provided with the insulating strip coating 121. The electrode plate in the present application may include a positive electrode plate and/or a negative electrode plate.

In the present application, the electrode plate may be coated on a single side or may be coated on both sides. Referring to FIG. 2, in an example, when the electrode plate is coated on a single side, the active material layer 111 and the insulating strip coating 121 may be arranged on a surface of the current collector 14; and referring to FIG. 3, in another example, when the electrode plate is coated on both sides, the active material layer 111 and the insulating strip coating 121 may be arranged on both surfaces of the current collector 14.

While the mechanism is not clear yet, the applicant unexpectedly finds that: the electrode plate in the present application comprises a main body region and an isolation region located on both sides of the main body region, where the isolation region is provided with an insulating strip coating, so that an outer edge of an active material layer is confined to a junction between the main body region and the isolation region. Further, a contact angle between a slurry forming the active material layer and the insulating strip coating is more than 90°, to improve a problem of diffusion of the active material slurry along a width direction of the electrode plate, thereby effectively improving width consistency of the active material layer in the electrode plate, reducing a risk of misalignment caused by inconsistent widths of active material layers on both sides of the electrode plate, and reducing a defective rate of the electrode plate.

In some embodiments, the insulating strip coating comprises a functional material. The functional material of the present application may include a hydrophobic material or an oleophobic material.

In some embodiments, the slurry forming the active material layer is a slurry of an aqueous system, and the insulating strip coating includes a hydrophobic material, so that there is a large contact angle between the insulating strip coating and the aqueous active material slurry. In this way, when the aqueous active material slurry is in contact with the insulating strip coating, the aqueous active material slurry is difficult to wet the insulating strip coating, thereby inhibiting diffusion of the aqueous active material slurry toward an edge of the electrode plate.

In some other embodiments, the slurry forming the active material layer is a slurry of an oily system, and the insulating strip coating includes an oleophobic material, so that there is a large contact angle between the insulating strip coating and the oily active material slurry. In this way, when the oily active material slurry is in contact with the insulating strip coating, the oily active material slurry is difficult to wet the insulating strip coating, thereby inhibiting diffusion of the oily active material slurry toward an edge of the electrode plate.

The hydrophobic material is not particularly limited in the present application, as long as the objective of the present application can be achieved. In an embodiment, the hydrophobic material comprises at least one of polyolefin, polycarbonate, polyamide, and polyacrylonitrile. The polyolefin is not particularly limited in the present application, as long as the objective of the present application can be achieved, for example, the polyolefin may include polypropylene.

The oleophobic material is not particularly limited in the present application, as long as the objective of the present application can be achieved. In an embodiment, the oleophobic material comprises at least one of polytetrafluoroethylene and nanometer $SiO_2$. A particle size of the nanometer $SiO_2$ is not particularly limited in the present application, for example, the particle size ranges from 10 nm to 1,000 nm.

Figure 3:
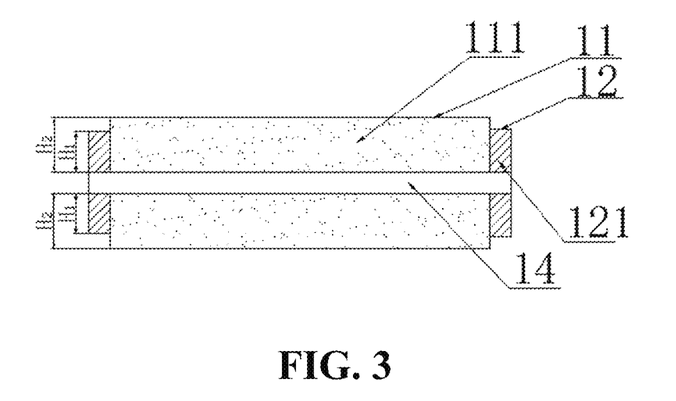
FIG. 3 is a schematic structural diagram of an electrode plate observed in a thickness direction according to an embodiment of the present application.

In some embodiments, referring to FIG. 2 and FIG. 3, the thickness $H_1$ of the insulating strip coating 121 is less than the thickness $H_2$ of the active material layer 111, thus avoiding situations that: too small thickness of the insulating strip coating may affect the inhibitory effect of the isolation region on the diffusion of the active material layer; and too large thickness of the insulating strip coating may affect die-cutting quality of the electrode plate, thus affecting quality of the electrode plate. Therefore, in the present application, the thickness of the insulating strip coating is less than the thickness of the active material layer, thereby enabling the isolation region to have a good inhibitory effect on the diffusion of the active material layer, and resulting in an electrode plate with good quality.

In some embodiments, the thickness $H_1$ of the insulating strip coating is from 5 μm to 30 μm, and the thickness $H_2$ of the active material layer is from 30 μm to 150 μm. The thickness $H_1$ of the insulating strip coating and the thickness $H_2$ of the active material layer are regulated to be within the above range, thereby enabling the insulating strip coating to have a good inhibitory effect on the diffusion of the active material layer, and resulting in an electrode plate with good quality. The width of the active material layer is not particularly limited in the present application, and electrode plates with the active material layer of different widths can be prepared as required. Of course, width design of the active material layer on sides A and B of the electrode plate is usually consistent.

In some embodiments, the thickness $H_1$ of the insulating strip coating and the thickness $H_2$ of the active material layer satisfy: $1/5 \leq H_1:H_2 \leq 2/3$, thereby reducing a risk of crushing the electrode plate due to too large thickness $H_1$ of the insulating strip coating during cold pressing, and contributing to further improvement of the quality of the electrode plate.

In some embodiments, the width of the insulating strip coating is from 1 mm to 20 mm, thus avoiding situations that: too large width of the insulating strip coating affects a welding effect of a tab, which is not conducive to improvement of yield of the electrode plate, and too small width of the insulating strip coating affects the inhibitory effect of the isolation region on the diffusion of the active material layer. Hence, in the present application, a width of the insulating strip coating is regulated to be within the above range, so that an electrode plate with good quality can be obtained.

Figure 4:
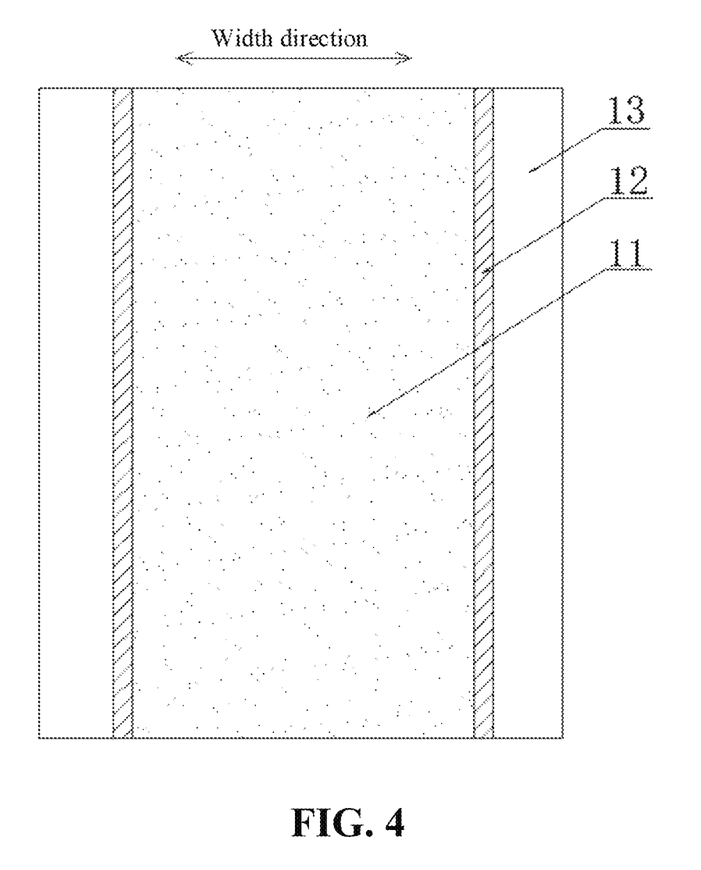
FIG. 4 is a schematic structural diagram of an electrode plate according to an embodiment of the present application.
Figure 5:
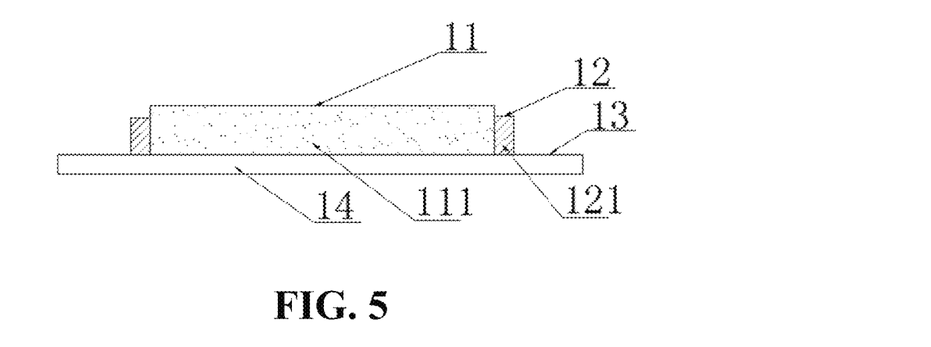
FIG. 5 is a schematic structural diagram of an electrode plate observed in a thickness direction according to an embodiment of the present application.

In some embodiments, referring to FIG. 4 and FIG. 5, the electrode plate in the present application further includes a blank region 13, and the blank region 13 is located on a side of the isolation region 12 away from the main body region 11 along the width direction of the electrode plate. The blank region 13 in the present application may refer to a region located at an edge of the electrode plate, a current collector is arranged on a surface of the blank region, and the blank region is capable of reserving space for the tab to gather electrons. In some embodiments, a width of the blank region is from 10 mm to 60 mm.

In an embodiment of the present application, a method for preparing an electrode plate is further provided, comprising steps of:

preparation of an insulating strip coating: mixing a functional material, an insulating material, and a first binder, then adding a first solvent into the mixture, to form a first slurry, coating the first slurry on both sides of a surface of a current collector along a length direction of the current collector, and drying to form two insulating strip coatings. A surface of the current collector uncoated with the first slurry between the two insulating strip coatings forms a main body region.

preparation of an active material layer: mixing an electrode active material, a conductive agent, and a second binder, then adding a second solvent into the mixture, to form a second slurry; coating the second slurry on the surface of the main body region, and drying to form the active material layer; where a contact angle between the second slurry and the insulating strip coating is more than 90°, and is optionally more than 125°.

In the preparation process, even if the active material slurry is accidentally coated on the surface of the insulating strip coating, because of the large contact angle between the slurry of the active material layer and the insulating strip coating, the active material slurry on the surface of the insulating strip coating can still be easily stripped after drying, thereby contributing to improvement of the yield of the electrode plate.

In the present application, the functional material is selected from a hydrophobic material or an oleophobic material. In some embodiments, when the functional material is selected from a hydrophobic material, the first solvent is selected from an oily solvent, and the second solvent is selected from an aqueous solvent. It is understandable that in a process of preparing a negative electrode active material layer, an aqueous solvent, such as deionized water, is usually used as the second solvent in the negative electrode active material slurry (second slurry), and correspondingly, an oily solvent is used as the first solvent. Based on this, this embodiment can be used in the preparation of a negative electrode plate.

In some other embodiments, when the functional material is selected from an oleophobic material, the first solvent is selected from an aqueous solvent, and the second solvent is selected from an oily solvent. It is understandable that in a process of preparing a positive electrode active material layer, an oily solvent, such as N-methyl pyrrolidone, is usually used as the second solvent in the positive electrode active material slurry (second slurry), and correspondingly, an aqueous solvent is used as the first solvent. Based on this, this embodiment can be used in the preparation of a positive electrode plate.

In some embodiments, based on a total mass of the insulating strip coating, a percentage mass content of the functional material is from 40% to 70%, a percentage mass content of the insulating material is from 20% to 30%, and a percentage mass content of the first binder is from 10% to 30%. The contents of the functional material, the insulating material, the first binder, and the first solvent are synergistically regulated to be within the above ranges, thereby enabling the insulating strip coating to have a good inhibitory effect on the diffusion of the active material layer.

The aqueous solvent and the oily solvent are not particularly limited in the present application, as long as the objective of the present application can be achieved. In some embodiments, the aqueous solvent is selected from at least one of deionized water, ethylene glycol, and ethanol, and has good dispersity for oleophobic materials; and the oily solvent is selected from at least one of N-methyl pyrrolidone, N-dimethylformamide, and dimethyl sulfoxide, and has good dispersity for hydrophobic materials.

The first binder and the second binder are not particularly limited in the present application, as long as the objective of the present application can be achieved. In some embodiments, the first binder and the second binder each independently comprise polyvinylidene fluoride or styrene butadiene rubber. The above binder has good interface bonding performance.

In some embodiments, the insulating material in the present application includes at least one of aluminum oxide and boehmite, the above insulating material has outstanding insulation characteristics, thereby enabling the insulating strip coating to have outstanding insulation performance, and improving the performance of the electrode plate. A particle size of the insulating material is not particularly limited in the present application, as long as the objective of the present application can be achieved.

In some embodiments, a blank region is formed on the surface of the current collector between an outer edge of each insulating strip coating away from the main body region and an edge of a long side of the current collector close thereto. For example, the first slurry can be coated at a certain distance from the edge of the long side of the current collector, thereby forming the blank region.

In addition, the secondary battery, the battery module, the battery pack, and the electrical apparatus in the present application are described below with reference to the drawings as appropriate.

In an embodiment of the present application, a secondary battery is provided.

In general, the secondary battery comprises a positive electrode plate, a negative electrode plate, an electrolyte, and a separator. During charging and discharging of the battery, active ions are intercalated and deintercalated back and forth between the positive electrode plate and the negative electrode plate. The electrolyte serves to conduct ions between the positive electrode plate and the negative electrode plate. The separator is provided between the positive electrode plate and the negative electrode plate, and mainly functions to prevent a short circuit between the positive electrode and the negative electrode, while allowing ions to pass through.

[Positive Electrode Plate]

The positive electrode plate comprises a positive electrode current collector and a positive electrode active material layer arranged on at least one surface of the positive electrode current collector.

As an example, the positive electrode current collector has two surfaces opposite in its own thickness direction, and the positive electrode active material layer is arranged on either one or both of the two opposite surfaces of the positive electrode current collector.

In some embodiments, the positive electrode current collector can be a metal foil or a composite current collector. For example, an aluminum foil can be used as the metal foil. The composite current collector can comprise a polymer material substrate layer and a metal layer formed on at least one surface of the polymer material substrate layer. The composite current collector may be formed by forming a metal material (such as aluminum, aluminum alloy, nickel, nickel alloy, titanium, titanium alloy, silver, and silver alloy) on a polymer material substrate (such as a substrate of polypropylene (PP), polyethylene terephthalate (PET), polybutylene terephthalate (PBT), polystyrene (PS), or polyethylene (PE)).

In some embodiments, the positive electrode active material may be a positive electrode active material for batteries well known in the art. As an example, the positive electrode active material may include at least one of the following materials: a lithium-containing phosphate of olivine structure, a lithium transition metal oxide, and a respective modified compound thereof. However, the present application is not limited to these materials, and other conventional materials useful as positive electrode active materials for batteries can also be used. These positive electrode active materials may be used alone or in combination of two or more thereof. Examples of lithium transition metal oxides may include, but are not limited to, at least one of a lithium-cobalt oxide (such as $LiCoO_2$), a lithium-nickel oxide (such as $LiNiO_2$), a lithium-manganese oxide (such as $LiMnO_2$ or $LiMn_2O_4$), a lithium-nickel-cobalt oxide, a lithium-manganese-cobalt oxide, a lithium-nickel-manganese oxide, a lithium-nickel-cobalt-manganese oxide (such as $LiNi_{1/3}Co_{1/3}Mn_{1/3}O_2$ (also abbreviated as $NCM_{333}$), $LiNi_{0.5}Co_{0.2}Mn_{0.3}O_2$ (also abbreviated as $NCM_{523}$), $LiNi_{0.5}Co_{0.25}Mn_{0.25}O_2$ (also abbreviated as $NCM_{211}$), $LiNi_{0.6}Co_{0.2}Mn_{0.2}O_2$ (also abbreviated as $NCM_{622}$), $LiNi_{0.8}Co_{0.1}Mn_{0.1}O_2$ (also abbreviated as $NCM_{811}$)), a lithium-nickel-cobalt-aluminum oxide (such as $LiNi_{0.85}Co_{0.15}Al_{0.05}O_2$), and a modified compound thereof. Examples of the lithium-containing phosphate of olivine structure may include, but are not limited to, at least one of lithium iron phosphate (such as $LiFePO_4$ (also abbreviated as LFP)), a composite material of lithium iron phosphate and carbon, lithium manganese phosphate (such as $LiMnPO_4$), a composite material of lithium manganese phosphate and carbon, lithium iron manganese phosphate, and a composite material of lithium iron manganese phosphate and carbon.

In some embodiments, the positive electrode active material layer further optionally comprises a binder. As an example, the binder may comprise at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluoroacrylate resin.

In some embodiments, the positive electrode active material layer further optionally comprises a conductive agent. As an example, the conductive agent may comprise at least one of superconducting carbon, acetylene black, carbon black, Ketjen black, carbon dot, carbon nanotube, graphene, and carbon nanofiber.

In some embodiments, the positive electrode plate may be prepared by: dispersing the above ingredients, such as the positive electrode active material, the conductive agent, the binder, and any other ingredient, for preparing the positive electrode plate in a solvent (such as N-methyl pyrrolidone) to form a positive electrode slurry; and coating the positive electrode slurry on the positive electrode current collector, drying, and cold pressing, to obtain the positive electrode plate.

[Negative Electrode Plate]

The negative electrode plate comprises a negative electrode current collector and a negative electrode active material layer arranged on at least one surface of the negative electrode current collector, the negative electrode active material layer comprising a negative electrode active material.

As an example, the negative electrode current collector has two surfaces opposite in its own thickness direction, and the negative electrode active material layer is arranged on either one or both of the two opposite surfaces of the negative electrode current collector.

In some embodiments, the negative electrode current collector can be a metal foil or a composite current collector. For example, a copper foil can be used as the metal foil. The composite current collector may comprise a polymer material substrate layer and a metal layer formed on at least one surface of a polymer material substrate. The composite current collector may be formed by forming a metal material (such as copper, copper alloy, nickel, nickel alloy, titanium, titanium alloy, silver, and silver alloy) on the polymer material substrate (such as a substrate of polypropylene (PP), polyethylene terephthalate (PET), polybutylene terephthalate (PBT), polystyrene (PS), or polyethylene (PE)).

In some embodiments, a negative electrode active material for a battery well-known in the art may be used as the negative electrode active material. As an example, the negative electrode active material may include at least one of artificial graphite, natural graphite, soft carbon, hard carbon, a silicon-based material, a tin-based material, lithium titanate, and the like. The silicon-based material may be at least one selected from the group consisting of elemental silicon, silicon-oxygen compound, silicon-carbon composite, silicon-nitrogen composite, and silicon alloy. The tin-based material may be at least one selected from elemental tin, tin-oxygen compound, and tin alloy. However, the present application is not limited to these materials, and other conventional materials useful as negative electrode active materials for batteries can also be used. It is possible to use only one of these negative electrode active materials alone, or to use more than two in combination.

In some embodiments, the negative electrode active material layer further optionally comprises a binder. The binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode active material layer further optionally comprises a conductive agent. The conductive agent may be selected from at least one of superconducting carbon, acetylene black, carbon black, Ketjen black, carbon dots, carbon nanotubes, graphene, and carbon nanofibers.

In some embodiments, the negative electrode active material layer further optionally comprises other adjuvants, for example, a thickener (such as sodium carboxymethylcellulose (CMC-Na)).

In some embodiments, the negative electrode plate may be prepared by: dispersing the above ingredients, such as the negative electrode active material, the conductive agent, the binder, and any other ingredient, for preparing the negative electrode plate in a solvent (such as deionized water) to form a negative electrode slurry; and coating the negative electrode slurry on the negative electrode current collector, drying, and cold pressing, to obtain the negative electrode plate.

[Electrolyte]

The electrolyte serves to conduct ions between the positive electrode plate and the negative electrode plate. The type of the electrolyte is not particularly limited in the present application, and can be selected according to requirements. For example, the electrolyte may be in a liquid, gel, or full solid state.

In some embodiments, an electrolyte solution is used as the electrolyte. The electrolyte solution comprises an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro(oxalato)borate, lithium bis(oxalate)borate, lithium difluoro bis(oxalato)phosphate, and lithium tetrafluoro(oxalato) phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone, and diethyl sulfone.

In some embodiments, the electrolyte solution further optionally comprises an additive. For example, the additive may include a negative electrode film-forming additive or a positive electrode film-forming additive, or may further include an additive that can improve some performance of the battery, such as an additive that improves overcharge performance of the battery or an additive that improves high-temperature or low-temperature performance of the battery.

[Separator]

In some embodiments, the secondary battery further comprises a separator. The type of the separator is not particularly limited in the present application, and any well-known separator with a porous structure having good chemical stability and mechanical stability may be selected.

In some embodiments, the material of the separator may be at least one selected from glass fiber, non-woven cloth, polyethylene, polypropylene, and polyvinylidene fluoride. The separator may be a single-layer film or a multi-layer composite film, and is not particularly limited. When the separator is a multilayer composite film, the material in each layer may be identical or different, which is not particularly limited.

In some embodiments, the positive electrode plate, the negative electrode plate, and the separator can be made into an electrode assembly by a winding process or a stacking process.

In some embodiments, the secondary battery may comprise an outer package. The outer package can be used to encapsulate the above-mentioned electrode assembly and electrolyte.

In some embodiments, the outer package of the secondary battery may be a hard case, such as a hard plastic case, an aluminum case, a steel case, and the like. The outer package of the secondary battery may also be a soft pack, such as a bag-type soft pack. The material of the soft pack may be a plastic, and examples of the plastic include polypropylene, polybutylene terephthalate and polybutylene succinate, etc.

Figure 6:
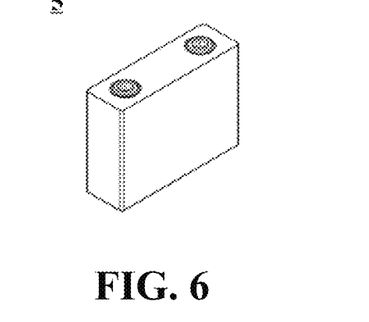
FIG. 6 is a schematic diagram of a secondary battery according to an embodiment of the present application.

The shape of the secondary battery is not particularly limited in the present application, and may be a cylinder, a square, or any other shape. For example, FIG. 6 is an example of a secondary battery 5 having a square structure.

Figure 7:
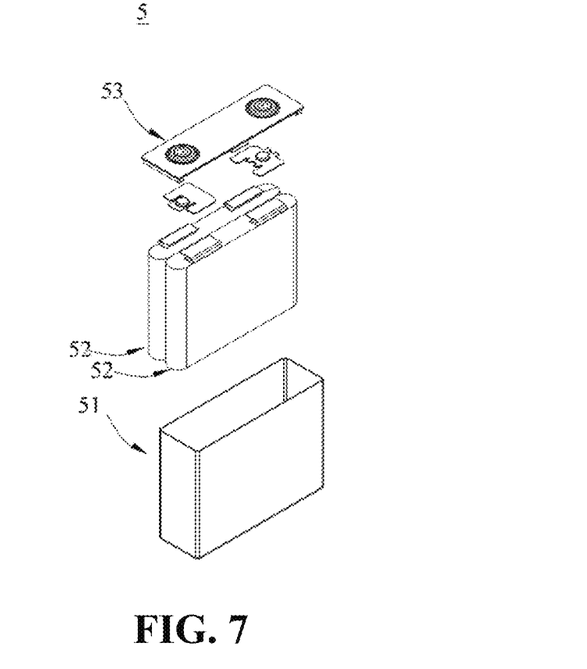
FIG. 7 is an exploded view of the secondary battery according to the embodiment of the present application as shown in FIG. 6.

In some embodiments, referring to FIG. 7, the outer package may comprise a case 51 and a cover plate 53. The case 51 may comprise a bottom plate and a side plate connected to the bottom plate, which enclose to form an accommodating cavity. The case 51 has an opening that communicates with the accommodating cavity, and the cover plate 53 can cover the opening to close the accommodating cavity. The positive electrode plate, the negative electrode plate, and the separator may form an electrode assembly 52 by a winding process or a stacking process. The electrode assembly 52 is encapsulated within the accommodating cavity. The electrolyte solution impregnates the electrode assembly 52. The number of electrode assemblies 52 comprised in the secondary battery 5 may be one or more, and may be selected by those skilled in the art according to specific actual requirements.

In some embodiments, the secondary batteries may be assembled into a battery module, and the number of the secondary batteries included in the battery module may be one or more, and the specific number may be selected by those skilled in the art according to the application and capacity of the battery module.

Figure 8:
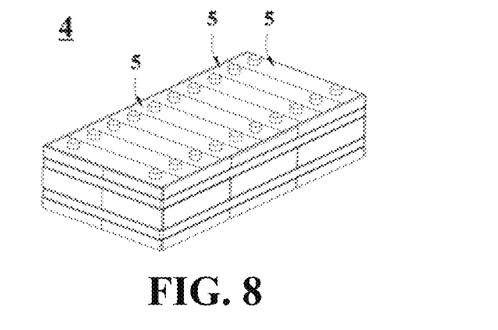
FIG. 8 is a schematic diagram of a battery module according to an embodiment of the present application.

FIG. 8 shows a battery module 4 as an example. Referring to FIG. 8, in the battery module 4, a plurality of secondary batteries 5 can be sequentially arranged along a length direction of the battery module 4. Of course, any other arrangement is also possible. The plurality of secondary batteries 5 may further be fixed by fasteners.

Optionally, the battery module 4 may further include a shell having an accommodating space, in which the plurality of secondary batteries 5 are accommodated.

In some embodiments, the battery modules may be further assembled into a battery pack, the number of battery modules comprised in the battery pack may be one or more, and the specific number may be selected by those skilled in the art based on the application and capacity of the battery pack.

Figure 9:
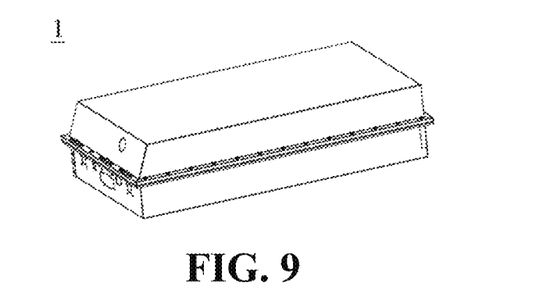
FIG. 9 is a schematic diagram of a battery pack according to an embodiment of the present application.
Figure 10:
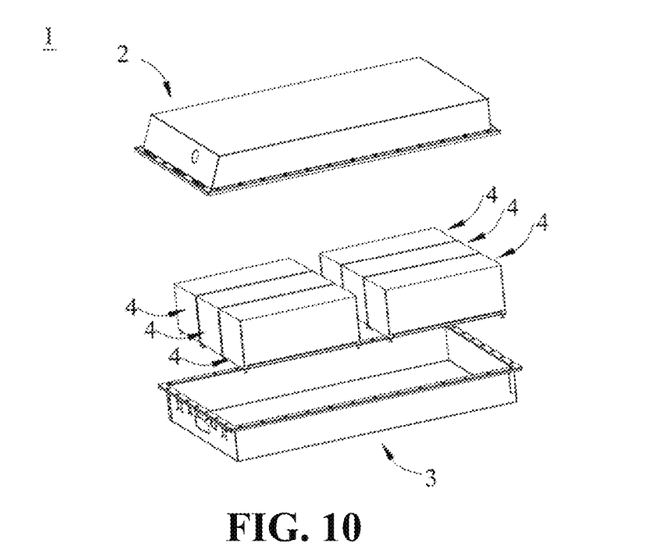
FIG. 10 is an exploded view of the battery pack according to an embodiment of the present application shown in FIG. 9.

FIG. 9 and FIG. 10 are a battery pack 1 as an example. Referring to FIG. 9 and FIG. 10, the battery pack 1 may comprise a battery box and a plurality of battery modules 4 arranged in the battery box. The battery box comprises an upper box 2 and a lower box 3, where the upper box 2 can cover the lower box 3 and forms an enclosed space for accommodating the battery module 4. The plurality of battery modules 4 may be arranged in the battery box in any manner.

In addition, the present application further provides an electrical apparatus, comprising at least one of the secondary batteries, the battery module, or the battery pack provided in the present application. The secondary battery, the battery module, or the battery pack can be used as a power source for the electrical apparatus, and can also be used as an energy storage unit for the electrical apparatus. The electrical apparatus may include, but is not limited to, a mobile device (such as a mobile phone, and a laptop, etc.), an electric vehicle (such as an all-electric vehicle, a hybrid electric vehicle, a plug-in hybrid electric vehicle, an electric bicycle, an electric scooter, an electric golf cart, and an electric truck, etc.), an electric train, a ship, a satellite, and an energy storage system, etc.

For the electrical apparatus, the secondary battery, the battery module, or the battery pack may be selected according to its use requirements.

Figure 11:
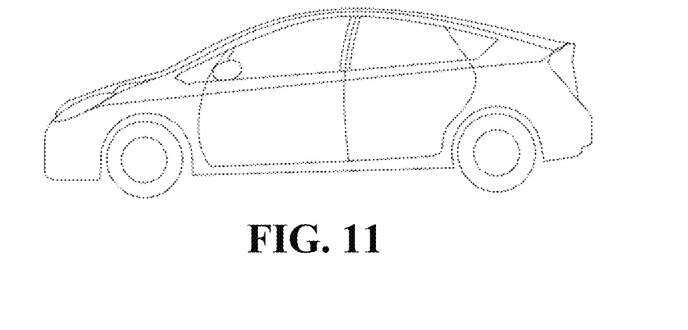
FIG. 11 is a schematic diagram of an electrical apparatus in which a secondary battery is used as a power source according to an embodiment of the present application.

FIG. 11 is an electrical apparatus as an example. The electrical apparatus is an all-electric vehicle, a hybrid electric vehicle, a plug-in hybrid electric vehicle, or the like. In order to meet the requirements of the electrical apparatus for high power and high energy density of secondary batteries, a battery pack or a battery module may be used.

As another example, the apparatus may be a mobile phone, a tablet, a laptop, etc. The apparatus is generally required to be light and thin, and may use a secondary battery as a power source.

EXAMPLES

Examples of the present application will be described below. The examples described below are illustrative, are merely used to explain the present application, and should not be construed as limitation on the present application. Where no specific techniques or conditions are specified in the examples, the techniques or conditions described in literatures of the art or the product specifications are prevailing. Where manufacturers are not specified, the reagents or instruments used are conventional products and are commercially available.

Example 1-1

<Preparation of an Insulating Strip Coating>

A functional material nanometer $SiO_2$ (average particle size: 500 nm), an insulating material aluminum oxide ($Al_2O_3$), and a first binder styrene butadiene rubber (SBR) at a mass ratio of 60:30:10 were mixed, and then a first solvent deionized water was added. The mixture was stirred under the action of a vacuum mixer until the system was uniform, to obtain a first slurry with a solid content of 30 wt %. An aluminum foil of 12 μm was used as a current collector, the first slurry was coated by extrusion coating on both sides of a surface of the current collector respectively along a length direction of the current collector, two insulating strip coatings were formed by drying at 90° C., and a blank region was formed on the surface of the current collector between an outer edge of each insulating strip coating away from a main body region and an edge of a long side of the current collector close thereto. Accordingly, the main body region was formed on a surface of the current collector uncoated with the first slurry between the two insulating strip coatings. The insulating strip coating had a thickness of 24 μm, a width of 10 mm, and a width of the blank region of 10 mm.

<Preparation of an Active Material Layer>

A positive electrode active material $LiNi_{0.8}Co_{0.1}Mn_{0.1}O_2$, a conductive agent conductive carbon black, and a second binder PVDF at a mass ratio of 96:2:2 were mixed, and then a second solvent N-methyl pyrrolidone (NMP) was added. The mixture was stirred under the action of a vacuum mixer until the system was uniform, to obtain a second slurry with a solid content of 60 wt %. The second slurry was coated by extrusion coating on a surface of the main body region, dried at 120° C., and cold pressed to obtain a positive electrode plate with a thickness of a positive electrode active material layer of 35 μm. Then, the above steps were repeated on another surface of the positive electrode plate to obtain a positive electrode plate with the insulating strip coating and the active material layer on both sides, and then obtain a positive electrode plate by, e.g., tab molding and cutting.

Example 1-2 to Example 1-6

These examples are same as Example 1-1 except that a type of the functional material, a type of the insulating material, a type of the first solvent, and a mass ratio between the ingredients in the first slurry were adjusted as shown in Table 1.

Example 1-7 to Example 1-8

These examples are same as Example 1-1 except that an addition amount of the first solvent was adjusted, so that a solid content of the first slurry was adjusted as shown in Table 1.

Example 2-1

<Preparation of an Insulating Strip Coating>

A functional material polyolefin (polypropylene), an insulating material aluminum oxide ($Al_2O_3$), and a first binder PVDF at a mass ratio of 60:30:10 were mixed, and then a first solvent NMP was added. The mixture was stirred under the action of a vacuum mixer until the system was uniform, to obtain a first slurry with a solid content of 30 wt %. A copper foil of 8 μm was used as a current collector, the first slurry was coated by extrusion coating on both sides of a surface of the current collector respectively along a length direction of the current collector, two insulating strip coatings were formed by drying at 90° C., and a blank region was formed on the surface of the current collector between an outer edge of each insulating strip coating away from the main body region and an edge of a long side of the current collector close thereto. Accordingly, the main body region was formed on a surface of the current collector uncoated with the first slurry between the two insulating strip coatings. The insulating strip coating had a thickness of 24 μm, a width of 5 mm, and a width of the blank region of 10 mm.

<Preparation of an Active Material Layer>

A negative electrode active material artificial graphite, a conductive agent conductive carbon black, and a second binder SBR at a mass ratio of 96:2:2 were mixed, and then a second solvent deionized water was added. The mixture was stirred under the action of a vacuum mixer until the system was uniform, to obtain a second slurry with a solid content of 60 wt %. The second slurry was coated by extrusion coating on a surface of the main body region, dried at 120° C., and cold pressed to obtain a negative electrode plate with a thickness of a negative electrode active material layer of 35 μm. Then, the above steps were repeated on another surface of the negative electrode plate to obtain a negative electrode plate with the insulating strip coating and the active material layer on both sides, and then obtain a negative electrode plate by, e.g., tab molding and cutting.

Example 2-2 to Example 2-9

These examples are same as Example 2-1 except that a type of the functional material, a type of the insulating material, a type of the first solvent, and a mass ratio between the ingredients in the first slurry was adjusted as shown in Table 2.

Example 2-10 to Example 2-11

These examples are same as Example 2-1 except that an addition amount of the first solvent was adjusted, so that a solid content of the first slurry was adjusted as shown in Table 2.

Example 3-1 to Example 3-7

These examples are same as Example 1-1 except that a thickness and a width of the insulating strip coating, and a thickness and a width of the active material layer were adjusted as shown in Table 3.

Example 4-1 to Example 4-7

These examples are same as Example 2-1 except that a thickness and a width of the insulating strip coating, and a thickness and a width of the active material layer were adjusted as shown in Table 4.

Comparative Example 1-1

This example is same as Example 1-1 except that the first slurry was free from the functional material, and a mass ratio between the ingredients in the first slurry was adjusted as shown in Table 1.

Comparative Example 2-1

This example is same as Example 2-1 except that the first slurry was free from the functional material, and a mass ratio between the ingredients in the first slurry was adjusted as shown in Table 2.

Relevant parameters in the above Example 1-1 to Example 1-8 and Comparative Example 1-1 are as shown in Table 1 below.

TABLE 1

| | First slurry | | | | | | Second slurry | |
|---|---|---|---|---|---|---|---|---|
| | Type of functional material | Type of insulating material | Type of first binder | Type of first solvent | Mass ratio between functional material, insulating material, and first binder | Solid content (wt %) | Type of second solvent | Contact angle between second slurry and insulating strip coating |
| Example 1-1 | Nanometer $SiO_2$ | $Al_2O_3$ | SBR | Deionized water | 60:30:10 | 30 | NMP | 110° |
| Example 1-2 | Nanometer $SiO_2$ | $Al_2O_3$ | SBR | Deionized water | 50:25:25 | 30 | NMP | 112° |
| Example 1-3 | Nanometer $SiO_2$ | $Al_2O_3$ | SBR | Deionized water | 70:20:10 | 30 | NMP | 120° |
| Example 1-4 | Polytetrafluoroethylene | $Al_2O_3$ | SBR | Deionized water | 60:30:10 | 30 | NMP | 117° |
| Example 1-5 | Polytetrafluoroethylene | Boehmite | SBR | Deionized water | 60:30:10 | 30 | NMP | 116° |
| Example 1-6 | Nanometer $SiO_2$ | $Al_2O_3$ | SBR | Ethanol | 60:30:10 | 30 | NMP | 112° |
| Example 1-7 | Nanometer $SiO_2$ | $Al_2O_3$ | SBR | Deionized water | 60:30:10 | 20 | NMP | 121° |
| Example 1-8 | Nanometer $SiO_2$ | $Al_2O_3$ | SBR | Deionized water | 60:30:10 | 40 | NMP | 120° |
| Comparative Example 1-1 | / | $Al_2O_3$ | SBR | Deionized water | 0:90:10 | 30 | NMP | / |

In the table, "/" means that a relevant parameter is absent.

Relevant parameters in the above Example 2-1 to Example 2-11 and Comparative Example 2-1 are as shown in Table 2 below.

TABLE 2

| | First slurry | | | | | | Second slurry | |
|---|---|---|---|---|---|---|---|---|
| | Type of functional material | Type of insulating material | Type of first binder | Type of first solvent | Mass ratio between functional material, insulating material, and first binder | Solid content (wt %) | Type of second solvent | Contact angle between second slurry and insulating strip coating |
| Example 2-1 | Polyolefin | $Al_2O_3$ | PVDF | NMP | 60:30:10 | 30 | Deionized water | 132° |
| Example 2-2 | Polyolefin | $Al_2O_3$ | PVDF | NMP | 40:30:30 | 30 | Deionized water | 122° |
| Example 2-3 | Polyolefin | $Al_2O_3$ | PVDF | NMP | 70:20:10 | 30 | Deionized water | 123° |
| Example 2-4 | Polycarbonate | $Al_2O_3$ | PVDF | NMP | 60:30:10 | 30 | Deionized water | 125° |
| Example 2-5 | Polyamide | $Al_2O_3$ | PVDF | NMP | 60:30:10 | 30 | Deionized water | 127° |
| Example 2-6 | Polyacrylonitrile | $Al_2O_3$ | PVDF | NMP | 60:30:10 | 30 | Deionized water | 121° |
| Example 2-7 | Polyolefin | Boehmite | PVDF | NMP | 60:30:10 | 30 | Deionized water | 132° |
| Example 2-8 | Polyolefin | $Al_2O_3$ | PVDF | N-dimethylformamide | 60:30:10 | 30 | Deionized water | 130° |

TABLE 2-continued

| | First slurry | | | | | Second slurry | |
|---|---|---|---|---|---|---|---|
| | Type of functional material | Type of insulating material | Type of first binder | Type of first solvent | Mass ratio between functional material, insulating material, and first binder | Solid content (wt %) | Type of second solvent | Contact angle between second slurry and insulating strip coating |
| Example 2-9 | Polyolefin | $Al_2O_3$ | PVDF | Dimethyl-sulfoxide | 60:30:10 | 30 | Deionized water | 131° |
| Example 2-10 | Polyolefin | $Al_2O_3$ | PVDF | NMP | 60:30:10 | 20 | Deionized water | 134° |
| Example 2-11 | Polyolefin | $Al_2O_3$ | PVDF | NMP | 60:30:10 | 40 | Deionized water | 129° |
| Comparative Example 2-1 | / | $Al_2O_3$ | PVDF | NMP | 0:90:10 | 30 | Deionized water | / |

In the table, "/" means that a relevant parameter is absent.

Relevant parameters in the above Example 3-1 to Example 3-7 are as shown in Table 3 below.

TABLE 3

| | Width of insulating strip coating (nm) | Thickness of insulating strip coating $H_1$ (μm) | Thickness of active material layer $H_2$ (μm) | $H_1/H_2$ |
|---|---|---|---|---|
| Example 1-1 | 5 | 24 | 35 | 24/35 |
| Example 3-1 | 1 | 5 | 30 | 1/6 |
| Example 3-2 | 10 | 30 | 50 | 3/5 |
| Example 3-3 | 20 | 30 | 120 | 3/12 |
| Example 3-4 | 5 | 2 | 35 | 2/35 |
| Example 3-5 | 5 | 50 | 35 | 10/7 |
| Example 3-6 | 0.5 | 20 | 35 | 5/7 |
| Example 3-7 | 30 | 20 | 35 | 5/7 |

In the table, "/" means that a relevant parameter is absent.

Relevant parameters in the above Example 4-1 to Example 4-7 are as shown in Table 4 below.

TABLE 4

| | Width of insulating strip coating (nm) | Thickness of insulating strip coating $H_1$ (μm) | Thickness of active material layer $H_2$ (μm) | $H_1/H_2$ |
|---|---|---|---|---|
| Example 2-1 | 5 | 24 | 35 | 24/35 |
| Example 4-1 | 1 | 5 | 30 | 1/6 |
| Example 4-2 | 10 | 30 | 50 | 3/5 |
| Example 4-3 | 20 | 30 | 100 | 3/10 |
| Example 4-4 | 5 | 2 | 35 | 2/35 |
| Example 4-5 | 5 | 50 | 35 | 10/7 |
| Example 4-6 | 0.5 | 20 | 35 | 5/7 |
| Example 4-7 | 30 | 20 | 35 | 5/7 |

In the table, "/" means that a relevant parameter is absent.

Test of the Contact Angle Between the Active Material Slurry and the Insulating Strip Coating:

The contact angle between the active slurry and the insulating strip coating was measured using a contact angle meter.

Test of the Thickness $H_1$ of the Insulating Strip Coating and the Thickness $H_2$ of the Active Material Layer:

The thickness $H_1$ of the insulating strip coating and the thickness $H_2$ of the active material layer were measured using a micrometer.

Test of the Defective Rate of the Electrode Plate:

Due to a large color difference between the active material and the insulating strip coating, a gray value was displayed using a charge coupled device (CCD) to distinguish a boundary between the active material layer and the insulating strip coating. 100 electrode plates prepared in each example and each comparative example were taken to ascertain using the CCD whether there is a clear interface between the insulating strip coating and the active material layer in each electrode plate as follows:

If the active material layer was not fused with the insulating strip coating, clear grayscale transition would be presented, there was a clear interface, and the electrode plate was ascertained to be good; and if the active material layer was fused with the insulating strip coating, unclear grayscale transition would be presented, there was not a clear interface, and the electrode plate was ascertained to be defective.

Then, statistical analysis of the number of good electrode plates and the number of defective electrode plates among the 100 electrode plates was conducted. Defective rate of electrode plates-number of defective electrode plates/100× 100%.

The electrode plate prepared in each example and each comparative example was tested for the defective rate of the electrode plate in each example and each comparative example according to the defective rate test method of the electrode plate provided in the present application. The results are as follows.

TABLE 5

| | Performance Test Results in Example 1-1 to Example 1-8 and Comparative Example 1-1 | | |
|---|---|---|---|
| | Number of defective electrode plates determined by CCD | Number of good electrode plates determined by CCD | Defective rate |
| Example 1-1 | 2 | 98 | 2% |
| Example 1-2 | 0 | 100 | 0% |
| Example 1-3 | 0 | 100 | 0% |
| Example 1-4 | 0 | 100 | 0% |
| Example 1-5 | 0 | 100 | 0% |
| Example 1-6 | 0 | 100 | 0% |

TABLE 5-continued

Performance Test Results in Example 1-1 to Example 1-8 and Comparative Example 1-1

| | Number of defective electrode plates determined by CCD | Number of good electrode plates determined by CCD | Defective rate |
|---|---|---|---|
| Example 1-7 | 0 | 100 | 0% |
| Example 1-8 | 0 | 100 | 0% |
| Comparative Example 1-1 | 100 | 0 | 100% |

As can be seen from the above results, the electrode plates in Example 1-1 to Example 1-8 have a low defective rate, so that the electrode plates with the insulating strip coating in the present application have reduced defective rate of the electrode plates, thereby enabling the electrode plates to have outstanding quality, reducing the scrapping of the electrode plates, and reducing the production costs.

In contrast, regarding the electrode plate in Comparative Example 1-1, because the first slurry is free from the functional material in the present application, the active material slurry tends to have a problem of diffusion outward along the width direction of the electrode plate, thereby resulting in a high defective rate, which is not conducive to reducing the production costs.

TABLE 6

Performance Test Results in Example 2-1 to Example 2-11 and Comparative Example 2-1

| | Number of defective electrode plates determined by CCD | Number of good electrode plates determined by CCD | Defective rate |
|---|---|---|---|
| Example 2-1 | 0 | 100 | 0% |
| Example 2-2 | 0 | 100 | 0% |
| Example 2-3 | 0 | 100 | 0% |
| Example 2-4 | 0 | 100 | 0% |
| Example 2-5 | 0 | 100 | 0% |
| Example 2-6 | 0 | 100 | 0% |
| Example 2-7 | 0 | 100 | 0% |
| Example 2-8 | 0 | 100 | 0% |
| Example 2-9 | 0 | 100 | 0% |
| Example 2-10 | 0 | 100 | 0% |
| Example 2-11 | 0 | 100 | 0% |
| Comparative Example 2-1 | 100 | 0 | 100% |

As can be seen from the above results, the electrode plates in Example 2-1 to Example 2-11 have a low defective rate, so that the electrode plates with the insulating strip coating in the present application have reduced defective rate of the electrode plates, thereby enabling the electrode plates to have outstanding quality, reducing the scrapping of the electrode plates, and reducing the production costs.

In contrast, regarding the electrode plate in Comparative Example 2-1, because the first slurry is free from the functional material in the present application, the active material slurry tends to have a problem of diffusion outward along the width direction of the electrode plate, thereby resulting in a high defective rate, which is not conducive to reducing the production costs.

TABLE 7

Performance Test Results in Example 3-1 to Example 3-7

| | Number of defective electrode plates determined by CCD | Number of good electrode plates determined by CCD | Defective rate |
|---|---|---|---|
| Example 1-1 | 2 | 98 | 2% |
| Example 3-1 | 1 | 99 | 1% |
| Example 3-2 | 0 | 100 | 0% |
| Example 3-3 | 0 | 100 | 0% |
| Example 3-4 | 15 | 85 | 15% |
| Example 3-5 | 12 | 88 | 12% |
| Example 3-6 | 35 | 65 | 35% |
| Example 3-7 | 19 | 81 | 19% |

The thickness $H_1$ of the insulating strip coating and the thickness $H_2$ of the active material layer generally will affect the defective rate of the electrode plate. As can be seen from Example 1-1 and Example 3-1 to Example 3-5, the thickness $H_1$ of the insulating strip coating and the thickness $H_2$ of the active material layer are regulated, to further reduce the defective rate of the electrode plate.

As can be further seen from Example 3-1 to Example 3-3, a ratio of the thickness $H_1$ of the insulating strip coating to the thickness $H_2$ of the active material layer is regulated, to further reduce the defective rate of the electrode plate.

The width of the insulating strip coating also affects the defective rate of the electrode plate. As can be further seen from Example 3-1 to Example 3-7, the width of the insulating strip coating is regulated, to further reduce the defective rate of the electrode plate.

TABLE 8

Performance Test Results in Example 4-1 to Example 4-7

| | Number of defective electrode plates determined by CCD | Number of good electrode plates determined by CCD | Defective rate |
|---|---|---|---|
| Example 2-1 | 0 | 100 | 0% |
| Example 4-1 | 2 | 98 | 2% |
| Example 4-2 | 0 | 100 | 0% |
| Example 4-3 | 0 | 100 | 0% |
| Example 4-4 | 20 | 80 | 20% |
| Example 4-5 | 31 | 69 | 31% |
| Example 4-6 | 26 | 74 | 26% |
| Example 4-7 | 19 | 81 | 19% |

The thickness $H_1$ of the insulating strip coating and the thickness $H_2$ of the active material layer generally will affect the defective rate of the electrode plate. As can be seen from Example 2-1 and Example 4-1 to Example 4-7, the thickness $H_1$ of the insulating strip coating and the thickness $H_2$ of the active material layer are regulated, to further reduce the defective rate of the electrode plate.

As can be further seen from Example 4-1 to Example 4-3, a ratio of the thickness $H_1$ of the insulating strip coating to the thickness $H_2$ of the active material layer is regulated, to further reduce the defective rate of the electrode plate.

The width of the insulating strip coating also affects the defective rate of the electrode plate. As can be further seen from Example 4-1 to Example 4-7, the width of the insulating strip coating is regulated, to further reduce the defective rate of the electrode plate.

Figure 12:
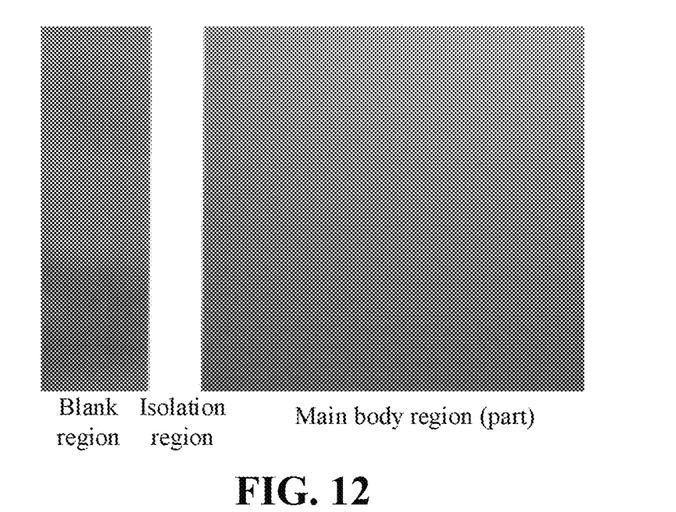
FIG. 12 is a photo of an electrode plate in Example 1-1.

FIG. 12 is a photo of the electrode plate prepared in Example 1-1 (the main body region is not completely shown in the figure because the main body region is wide). As can be seen from the figure, a clear interface is formed between the main body region and the isolation region of the electrode plate, indicating that the active material in the main body region does not have a phenomenon of diffusion along the width direction of the electrode plate.

Figure 13:
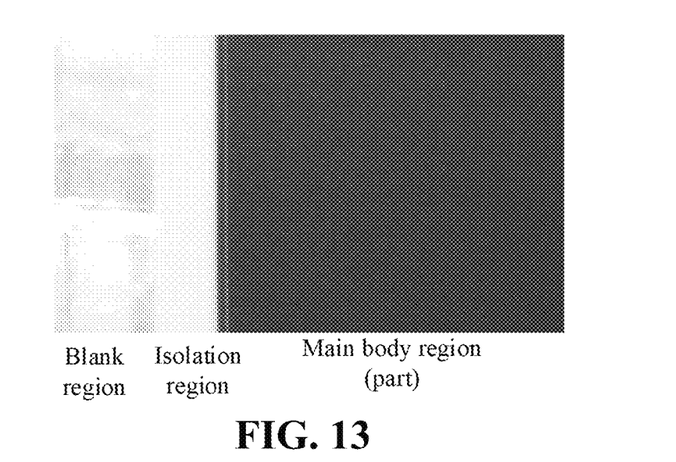
FIG. 13 is a photo of an electrode plate in Comparative Example 1-1.

FIG. 13 is a photo of the electrode plate prepared in Comparative Example 1-1 (the main body region is not completely shown in the figure because the main body region is wide). As can be seen from the figure, an unclear interface is formed between the main body region and the isolation region of the electrode plate, indicating that the active material in the main body region does not have a phenomenon of diffusion along the width direction of the electrode plate.

It should be noted that the present application is not limited to the above embodiments. The above embodiments are merely illustrative, and embodiments having substantively the same composition and having the same effects as the technical ideas within the scope of the technical solutions of the present application are all included in the technical scope of the present application. In addition, without departing from the scope of the subject matter of the present application, various modifications that can be conceived by those skilled in the art are applied to the embodiments, and other modes constructed by combining some of the constituent elements of the embodiments are also included in the scope of the present application.

What is claimed is:

1. An electrode plate, comprising,
    a main body region and an isolation region, wherein the isolation region is arranged on both sides of the main body region along a width direction of the electrode plate, the isolation region is provided with an insulating strip coating, and the main body region is provided with an active material layer, wherein,
    an outer edge of the active material layer is confined to a junction between the main body region and the isolation region, and a contact angle between a slurry forming the active material layer and the insulating strip coating is more than 90°, and is optionally more than 125°,
    the slurry forming the active material layer is a slurry of an oily system, and the insulating strip coating comprises an oleophobic material,
    the oleophobic material comprises at least one of polytetrafluoroethylene and nanometer $SiO_2$.

2. The electrode plate according to claim 1, wherein a thickness $H_1$ of the insulating strip coating is less than a thickness $H_2$ of the active material layer.

3. The electrode plate according to claim 2, wherein the thickness $H_1$ of the insulating strip coating is from 5 μm to 30 μm, and the thickness $H_2$ of the active material layer is from 30 μm to 150 μm.

4. The electrode plate according to claim 3, wherein the thickness $H_1$ of the insulating strip coating and the thickness $H_2$ of the active material layer satisfy $1/5 \leq H_1:H_2 \leq 2/3$.

5. The electrode plate according to claim 1, wherein a width of the insulating strip coating is from 1 mm to 20 mm.

6. A secondary battery, comprising at least one selected from the electrode plate according to claim 1.

7. A battery module, comprising the secondary battery according to claim 6.

8. A battery pack, comprising the battery module according to claim 7.

9. An electrical apparatus, comprising the secondary battery according to claim 6.

10. A method for preparing an electrode plate, comprising:
    preparation of an insulating strip coating, wherein the preparation of the insulating strip coating comprises:
        mixing a functional material, an insulating material, and a first binder to form a first mixture,
        adding a first solvent into the first mixture, to form a first slurry,
        coating the first slurry on both sides of a surface of a current collector along a length direction of the current collector, and
        drying to form two insulating strip coatings;
    wherein a surface of the current collector uncoated with the first slurry between the two insulating strip coatings along a width direction of the current collector forms a main body region, and the functional material comprises an oleophobic material, the oleophobic material comprises at least one of polytetrafluoroethylene and nanometer $SiO_2$; and
    preparation of an active material layer, wherein the preparation of the active material layer comprises:
        mixing an electrode active material, a conductive agent, and a second binder to form a second mixture,
        adding a second solvent into the second mixture, to form a second slurry;
        coating the second slurry on the surface of the main body region, and
        drying to form the active material layer;
    wherein a contact angle between the second slurry and the insulating strip coating is more than 90°, and is optionally more than 125°.

11. The preparation method according to claim 10, wherein based on a total mass of the insulating strip coating, a percentage mass content of the functional material is from 40% to 70%, a percentage mass content of the insulating material is from 20% to 30%, and a percentage mass content of the first binder is from 10% to 30%.

12. The preparation method according to claim 10, wherein
    the first solvent is selected from an aqueous solvent, and the second solvent is selected from an oily solvent.

13. The preparation method according to claim 10, wherein the first binder and the second binder each independently comprise polyvinylidene fluoride or styrene butadiene rubber.

14. The preparation method according to claim 10, wherein the insulating material comprises at least one of aluminum oxide and boehmite.

15. An electrode plate, comprising,
    a main body region and an isolation region, wherein the isolation region is arranged on both sides of the main body region along a width direction of the electrode plate, the isolation region is provided with an insulating strip coating, and the main body region is provided with an active material layer, wherein,
    an outer edge of the active material layer is confined to a junction between the main body region and the isolation region, and a contact angle between a slurry forming the active material layer and the insulating strip coating is more than 90°, and is optionally more than 125°,
    the thickness $H_1$ of the insulating strip coating is from 5 μm to 30 μm, and the thickness $H_2$ of the active material layer is from 30 μm to 150 μm.

16. The electrode plate according to claim 15, wherein the insulating strip coating comprises a functional material; wherein, the slurry forming the active material layer is a slurry of an aqueous system, and the insulating strip coating comprises a hydrophobic material; or, the slurry forming the active material layer is a slurry of an oily system, and the insulating strip coating comprises an oleophobic material.

17. The electrode plate according to claim 16, wherein the hydrophobic material comprises at least one of polyolefin, polycarbonate, polyamide, or polyacrylonitrile, wherein the oleophobic material comprises at least one of polytetrafluoroethylene and nanometer $SiO_2$.

18. The electrode plate according to claim 15, wherein the thickness Hi of the insulating strip coating and the thickness $H_2$ of the active material layer satisfy $1/5 \leq H_1:H_2 \leq 2/3$.

19. The electrode plate according to claim 15, wherein a width of the insulating strip coating is from 1 mm to 20 mm.

\* \* \* \* \*